(12) United States Patent
Yamato et al.

(10) Patent No.: US 10,061,515 B2
(45) Date of Patent: Aug. 28, 2018

(54) INFORMATION PROCESSING APPARATUS AND MEMORY SYSTEM

(71) Applicant: TOSHIBA MEMORY CORPORATION, Minato-ku (JP)

(72) Inventors: Masanori Yamato, Kawasaki (JP); Shigenori Sugimoto, Yokohama (JP); Toshio Fujisawa, Yokohama (JP); Naoto Oshiyama, Ota (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 188 days.

(21) Appl. No.: 14/638,441

(22) Filed: Mar. 4, 2015

(65) Prior Publication Data

US 2016/0077737 A1 Mar. 17, 2016

Related U.S. Application Data

(60) Provisional application No. 62/049,094, filed on Sep. 11, 2014.

(51) Int. Cl.
*G06F 3/06* (2006.01)
*G06F 13/16* (2006.01)
(52) U.S. Cl.
CPC ............ *G06F 3/061* (2013.01); *G06F 3/0655* (2013.01); *G06F 3/0679* (2013.01); *G06F 13/16* (2013.01); *G06F 2206/1014* (2013.01)
(58) Field of Classification Search
CPC ........ G06F 3/061; G06F 3/062; G06F 3/0655; G06F 3/0673; G06F 3/0679; G06F 2206/1014; G06F 12/0238; G06F 12/0246; G06F 2210/72

See application file for complete search history.

(56) References Cited

U.S. PATENT DOCUMENTS

| | | | | |
|---|---|---|---|---|
| 8,843,696 B2* | 9/2014 | Hasegawa | ............... | G06F 13/16 711/100 |
| 8,935,465 B1* | 1/2015 | Shaharabany | ...... | G06F 12/0246 711/103 |
| 9,176,673 B2* | 11/2015 | Watanabe | ............. | G06F 3/0613 |
| 2007/0294487 A1 | 12/2007 | Mino et al. | | |
| 2009/0083478 A1* | 3/2009 | Kunimatsu | ......... | G06F 12/0246 711/103 |
| 2009/0222627 A1* | 9/2009 | Reid | ................... | G06F 12/0804 711/135 |

(Continued)

FOREIGN PATENT DOCUMENTS

| | | |
|---|---|---|
| JP | 11 73366 | 3/1999 |
| JP | 2003 6144 | 1/2003 |

(Continued)

*Primary Examiner* — Ramon A Mercado
(74) *Attorney, Agent, or Firm* — Oblon, McClelland, Maier & Neustadt, L.L.P.

(57) ABSTRACT

According to one embodiment, an information processing apparatus includes a host and a memory system. The host includes a main memory. The memory system includes a memory access unit and an interface unit. The memory access unit converts a first request into transmission information. The first request is a request for data transfer toward a memory region as a part of the main memory. The interface unit transmits transmission information according to an instruction from the memory access unit.

18 Claims, 10 Drawing Sheets

(56) References Cited

U.S. PATENT DOCUMENTS

| | | | |
|---|---|---|---|
| 2012/0151127 A1* | 6/2012 | Lim | G06F 12/0246 |
| | | | 711/103 |
| 2012/0191900 A1* | 7/2012 | Kunimatsu | G06F 3/0679 |
| | | | 711/103 |
| 2014/0181367 A1* | 6/2014 | Gries | G06F 12/0246 |
| | | | 711/103 |
| 2015/0149688 A1* | 5/2015 | Yun | G06F 3/0632 |
| | | | 711/102 |
| 2016/0077737 A1* | 3/2016 | Yamato | G06F 3/061 |
| | | | 711/103 |
| 2016/0231803 A1* | 8/2016 | Iwai | G06F 1/3287 |

FOREIGN PATENT DOCUMENTS

| | | |
|---|---|---|
| JP | 2007 334564 | 12/2007 |
| WO | 03 001387 A1 | 1/2003 |

* cited by examiner

UM DATA IN UMPIU

| 0 | 1 | 2 | 3 |
|---|---|---|---|
| 0000 1010b | Flags | Reserved | UM ID |
| 4 | 5 | 6 (MSB) Data Segment Length | 7 (LSB) Data Segment Length |
| Reserved | Reserved | | |
| 8 (MSB) | 9 | 10 | 11 (LSB) |
| Target UM Area Offset | | | |
| 12 | 13 | 14 | 15 |
| Reserved | Reserved | Reserved | Reserved |
| 16 | | | 19 |
| Data | | | |
| ... | | | |
| Data Segment Length+12 | Data Segment Length+13 | Data Segment Length+14 | Data Segment Length+15 |
| Data | | | |

UM DATA OUT UMPIU

| 0 | 1 | 2 | 3 |
|---|---|---|---|
| 0010 1010b | Flags | Reserved | UM ID |
| 4 | 5 | 6 | 7 |
| Reserved | Reserved | (MSB) Data Segment Length | (LSB) Data Segment Length |
| 8 | 9 | 10 | 11 |
| Reserved | Reserved | Reserved | Reserved |
| 12 | 13 | 14 | 15 |
| Reserved | Reserved | Reserved | Reserved |
| 16 | | | 19 |
| Data | | | |
| ... | | | |
| Data Segment Length+12 | Data Segment Length+13 | Data Segment Length+14 | Data Segment Length+15 |
| Data | | | |

INFORMATION PROCESSING APPARATUS AND MEMORY SYSTEM

CROSS-REFERENCE TO RELATED APPLICATIONS

This application is based upon and claims the benefit of priority from U.S. Provisional Application No. 62/049,094, filed on Sep. 11, 2014; the entire contents of which are incorporated herein by reference.

FIELD

Embodiments described herein relate generally to an information processing apparatus and a memory system.

BACKGROUND

A Unified Memory Architecture (UMA) is a memory architecture in which a main memory provided in a host is shared between the host and a device. In some information processing apparatuses, a main memory is shared between a host and a memory system which serves as an external memory device of the host.

DETAILED DESCRIPTION

In general, according to one embodiment, an information processing apparatus includes a host and a memory system. The host includes a main memory. The memory system includes a non-volatile memory. The memory system is connected to the host via a communication path. The memory system includes a first controller. The first controller controls data transfer between the non-volatile memory and the host. The host includes a second controller. The second controller controls data transfer between the main memory and the memory system. The first controller includes a memory access unit, a request issuing unit, and an interface unit. The memory access unit executes data transfer toward a memory region which is a part of the main memory. The request issuing unit issues a first request. The first request is a request for data transfer toward the memory region. The interface unit is connected to a second controller via the communication path. The memory access unit converts the first request issued by the request issuing unit into transmission information. The interface unit transmits the transmission information to the second controller according to an instruction from the memory access unit. The second controller converts the transmission information from the interface unit into a second request. The second request is a request of data transfer toward the memory region. The second controller executes a process based on the second request.

Exemplary embodiments of an information processing apparatus and a memory system will be explained below in detail with reference to the accompanying drawings. The present invention is not limited to the following embodiments.

(Embodiment)

Figure 1:
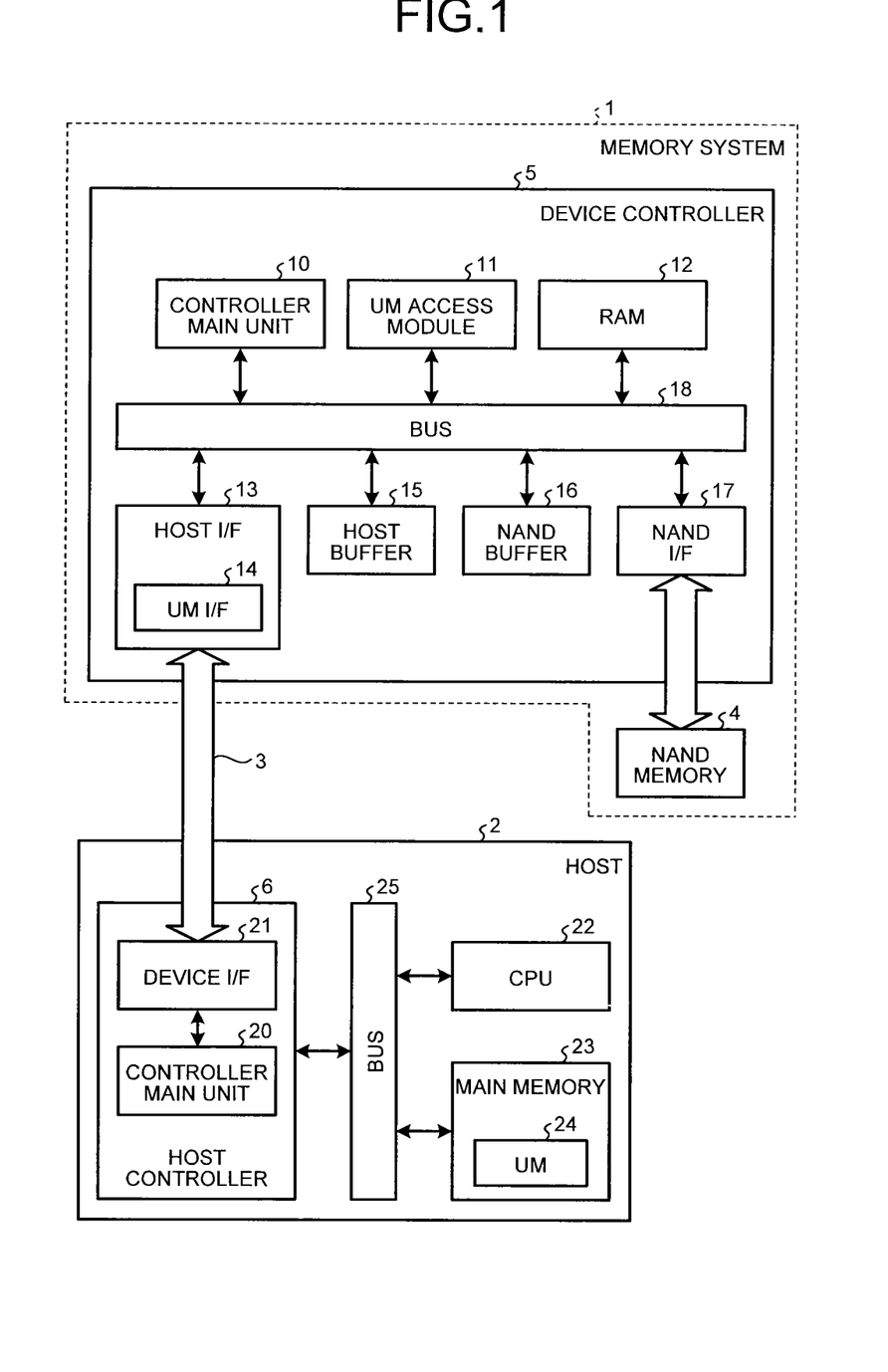
FIG. 1 is a block diagram illustrating a general structure of an information processing apparatus according to an embodiment.

FIG. 1 is a block diagram illustrating a general structure of an information processing apparatus according to an embodiment. The information processing apparatus includes a memory system 1 and a host 2. The memory system 1 is an external memory device of the host 2. The information processing apparatus is a personal computer, a cell phone, an imaging device or the like.

The memory system 1 is a flash memory compliant with the Universal Flash Storage (UFS) standard. The memory system 1 may be compliant with a standard other than the UFS standard.

A communication path 3 connects the memory system 1 and the host 2. As a communication standard of the communication path 3, Mobile Industry Processor Interface (MIPI) M-PHY is employed, for example. The communication path 3 may employ any communication standard.

A Unified Memory (UM) 24 is a memory region which is a part of a main memory 23 in the host 2. In the information processing apparatus, the host 2 and the memory system 1 share the UM 24. The UM 24 is a memory region, in the main memory 23, which enables data transfer in response to a memory access of the device controller 5.

The memory system 1 includes a NAND memory 4 which is a non-volatile memory and a device controller 5. The NAND memory 4 is a NAND-type flash memory. The NAND memory 4 stores data from the host 2.

The NAND memory 4 is composed of one or more memory chips having a memory cell array. The memory cell array has a plurality of memory cells which are arranged in a matrix. The NAND memory 4 writes and reads data in unit of page. The NAND memory 4 deletes data in unit of block including a plurality of pages.

The device controller 5 as a first controller includes each module of a controller main unit 10, a UM access module 11, a RAM 12, a host interface (I/F) 13, a host buffer 15, a NAND buffer 16 and a NAND interface (I/F) 17. A bus 18 is a transmission path between the modules.

The controller main unit 10 unifies management of processes between the units in the device controller 5. The controller main unit 10 is a CPU or other control device. The controller main unit 10 controls data transfer between the NAND memory 4 and the host 2. The controller main unit 10 serving as a second processor is a request issuing unit which issues a first request. The first request is a request for data transfer toward the UM 24.

The UM access module 11 serving as a first processor is a memory access unit which executes data transfer toward the UM 24. The UM access module 11 converts the first request issued by the controller main unit 10 into a packet as transmission information. The packet is information to be transmitted from the device controller 5 to a host controller 6 via the communication path 3. The RAM 12 temporarily stores data to be processed in the controller main unit 10.

The host I/F 13 serving as the interface unit is a connection interface to the communication path 3. The host I/F 13 is connected to a device interface (I/F) 21 of the host 2 via the communication path 3. The host I/F 13 executes transmission and reception of a command, an address and data to and from the host 2. The transmission and reception are executed based on a protocol.

The host I/F 13 includes a UM interface (I/F) 14. The UM I/F 14 executes transmission and reception of a command, an address and data of data transfer toward the UM 24. The UM I/F 14 transmits a packet to the host controller 6 according to an instruction from the UM access module 11.

The host buffer 15 as a storage unit temporarily stores data transmitted from the host I/F 13 and data received by the host I/F 13. The NAND I/F 17 is a connection interface to the NAND memory 4. The NAND buffer 16 temporarily stores data transmitted from the NAND I/F 17 to the NAND memory 4 and data from the NAND memory 4 received by the NAND I/F 17.

The controller main unit 10 receives data from the host 2 via the host I/F 13. The controller main unit 10 writes the received data in the NAND memory 4 via the NAND I/F 17.

The controller main unit 10 reads data from the NAND memory 4 in response to a request from the host 2. The controller main unit 10 reads data from the NAND memory 4 via the NAND I/F 17. The controller main unit 10 transmits the data read from the NAND memory 4 to the host 2 via the host I/F 13.

The host 2 includes each unit of the host controller 6, a CPU 22 and a main memory 23. A bus 25 is a transmission path between the units. The CPU 22 manages the host 2 overall.

The host controller 6 as a second controller includes a controller main unit 20 and a device I/F 21. The controller main unit 20 controls the host controller 6 overall. The controller main unit 20 is a CPU or other control device. The host controller 6 controls data transfer between the main memory 23 and the memory system 1.

The controller main unit 20 converts a packet from the UM I/F 14 into a second request. The second request is a request for data transfer toward the UM 24. The controller main unit 20 executes a process based on the second request.

The device I/F 21 is a connection interface to the communication path 3. The device I/F 21 is connected to the host I/F 13 of the device controller 5 via the communication path 3. The device I/F 21 executes transmission and reception of a command, an address and data to and from the device controller 5. The transmission and reception are executed based on a protocol.

The main memory 23 is composed of a volatile memory such as a RAM. A memory region which is a part of the main memory 23 is allocated to the UM 24. The main memory 23 includes a work area or the like for data processing of the CPU 22 in addition to the UM 24.

The controller main unit 20 receives data from the memory system 1 via the device I/F 21. The controller main unit 20 writes the received data to the main memory 23. The controller main unit 20 reads data from the main memory 23 in response to a request from the CPU 22. The controller main unit 20 transmits the read data to the memory system 1 via the device I/F 21.

When the execution of the process based on the second request is completed, the controller main unit 20 generates a packet as response information. The packet is information to be sent back from the host controller 6 to the device controller 5 via the communication path 3. The device I/F 21 transmits the packet generated in the controller main unit 20 to the device controller 5.

The controller main unit 10 issues, as a first request, a memory read request, a memory write request and a memory copy request. The host controller 6 executes processes based on, as a second request, the memory read request, memory write request and memory copy request.

The memory read request is a request to read data stored in the UM 24 out to the device controller 5. The memory write request is a request to write data stored in the device controller 5 to the UM 24. The memory copy request is a request to make a copy of data stored in the UM 24 within the UM 24.

Figure 2:
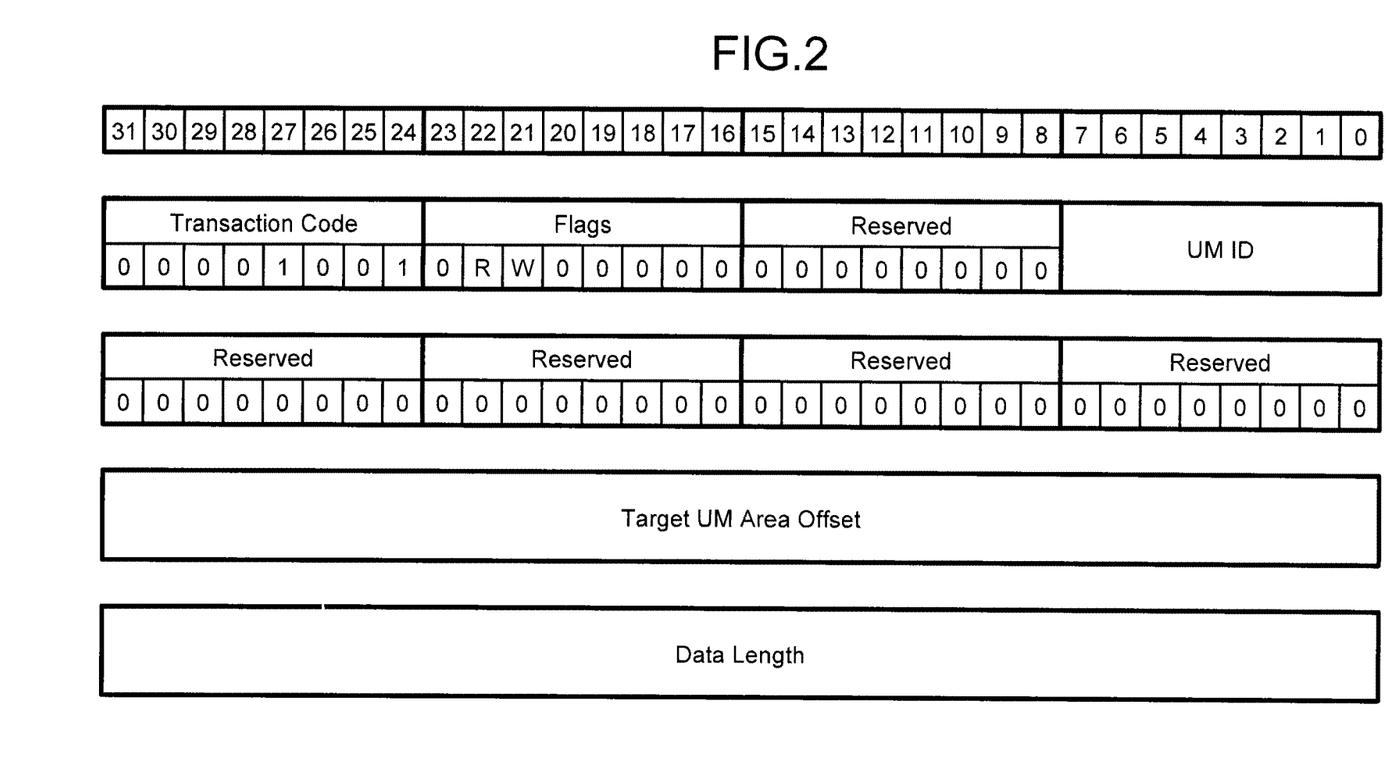
FIG. 2 is a diagram illustrating a configuration example of a header part of transmission information.

FIG. 2 is a diagram illustrating a structure example of a header part of transmission information. The UM access module 11 generates a packet as transmission information. The packet is assumed to be UMPIU. UMPIU is a packet compliant with a standard which is an expansion of UFS standard. The UM access module 11 generates information to be stored in the header part based on information of a command and an address included in the request from the controller main unit 10.

The header part illustrated in FIG. 2 is a header part of a packet generated based on a memory read request and a memory write request. Upon receiving a memory read request or a memory write request from the controller main unit 10, the UM access module 11 generates Command UMPIU. Command UMPIU includes a header part of the structure illustrated in FIG. 2.

When receiving a memory write request, the UM access module 11 generates UM DATA IN UMPIU after Command UMPIU. UM DATA IN UMPIU includes a header part and a data part. The header part of UM DATA IN UMPIU has a structure same as that of the header part illustrated in FIG. 2.

Each field illustrated as one line in FIG. 2 has the size of one word. Here, "one word" has 32 bits. The field illustrated as one line is divided into four fields. Each field has the size of eight bits.

In FIG. 2, "00001001" set in "Transaction code" represents that the packet is Command UMPIU generated based on a memory read request or a memory write request. "Flags. R" is a flag representing an operation of reading out data from the device controller 5 to the UM 24. In a packet generated based on a memory read request, "1" is set in "Flags. R." "Flags. W" is a flag representing an operation of writing data from the device controller 5 to the UM 24. In a packet generated based on a memory write request, "1" is set in "Flags. W."

"UM ID" indicates a command identifier. "Target UM Area Offset" indicates an offset in the UM 24. In a packet generated based on a memory read request, "Target UM Area Offset" represents a start point of a region where data to be read is stored. In a packet generated based on a memory write request, "Target UM Area Offset" represents a start point of a region where data is to be written. "Data Length" indicates the size of data to be read or written.

Figure 3:
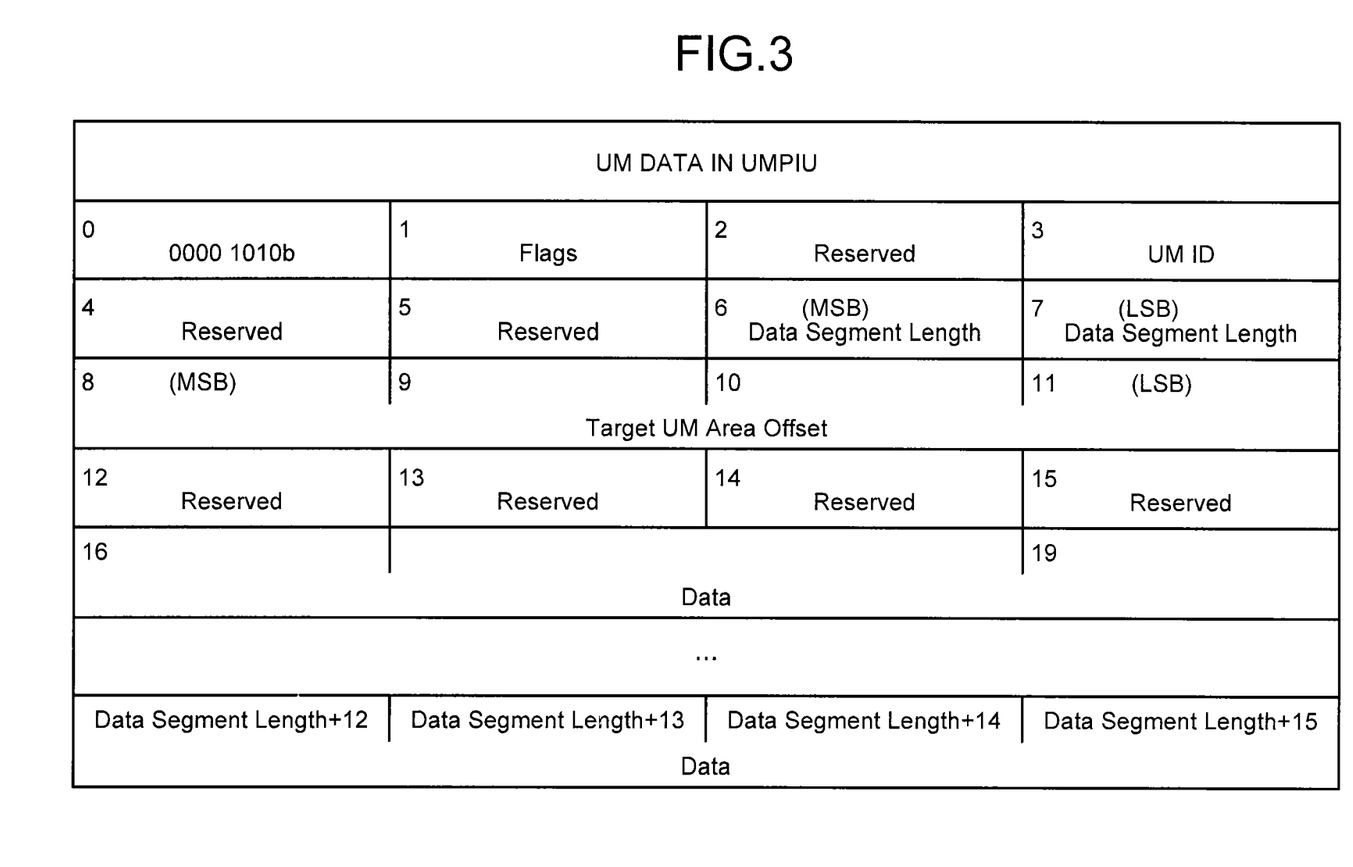
FIG. 3 is a diagram illustrating a format example of a data packet (UM DATA IN UMPIU) generated based on a memory write request.

FIG. 3 is a diagram illustrating a format example of a data packet (UM DATA IN UMPIU) generated based on a memory write request. UM DATA IN UMPIU is UMPIU for transmitting data, which is to be written, from the memory system 1 to the UM 24. In the diagram, numbers applied in the upper left part of each field represent field numbers. Field 0 to Field 15 are a header part. Field 16 and subsequent fields are a data part.

In UM DATA IN UMPIU, "Transaction code," "Flags," "UM ID" and "Target UM Area Offset" are stored in the same manner as Command UMPIU illustrated in FIG. 2. "00001010b" stored in Field 0 is a Transaction code which indicates that the packet is UM DATA IN UMPIU. "Data Segment Length" indicates the size of data stored in the packet. The data stored in Field 16 and subsequent fields is in the size indicated by "Data Segment Length."

The UM access module 11 may have two formats as packet formats. The UM access module 11 selects one of the two formats according to data size.

Figure 4:
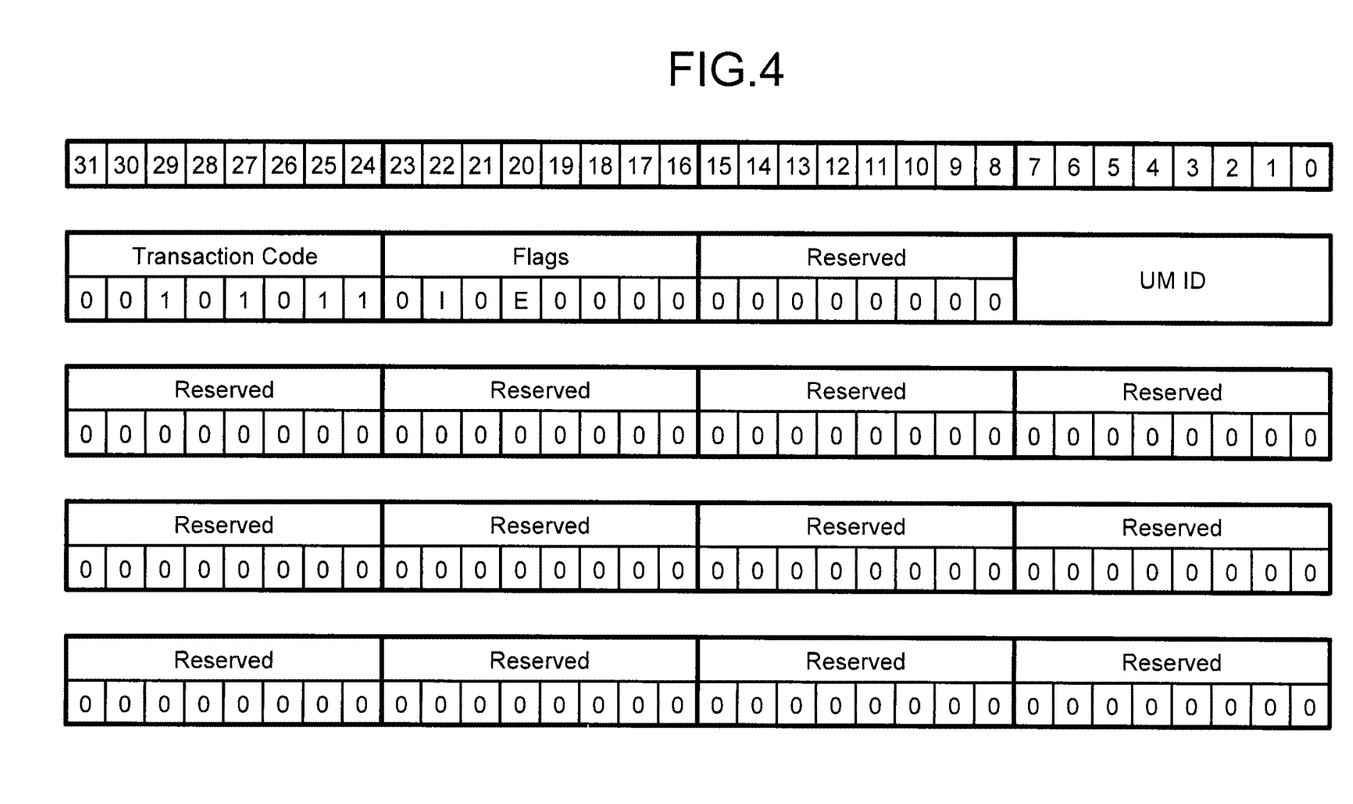
FIG. 4 is a diagram illustrating of a configuration example of a header part of response information.

FIG. 4 is a diagram illustrating a structure example of a header part of response information. The controller main unit 20 of the host controller 6 generates a packet as response information. The packet is assumed to be UMPIU. The controller main unit 20 generates information to be stored in the header part based on information of a command included in a request.

The header part illustrated in FIG. 4 is a header part of a packet generated after executing a process based on a memory read request or a memory write request. When a process based on a memory write request or a memory read request is executed, the controller main unit 20 generates Response UMPIU. Response UMPIU includes a header part having the structure illustrated in FIG. 4.

When a process based on a memory read request is executed, the controller main unit 20 generates UM DATA OUT UMPIU before Response UMPIU. UM DATA OUT UMPIU includes a header part and a data part. The header part of UM DATA OUT UMPIU has a structure same as that of the header part illustrated in FIG. 4.

The header part illustrated in FIG. 4 has a structure same as that of the header part illustrated in FIG. 2. In FIG. 4, "00101011" set in "Transaction code" indicates that the packet is Response UMPIU based on a memory read request or a memory write request. "Flags" is a flag which indicates a content of an error in an execution of a process based on a request. According to the content of the error, "1" is set in "Flags. I" or "Flags. E." "UM ID" indicates a command identifier.

Figure 5:
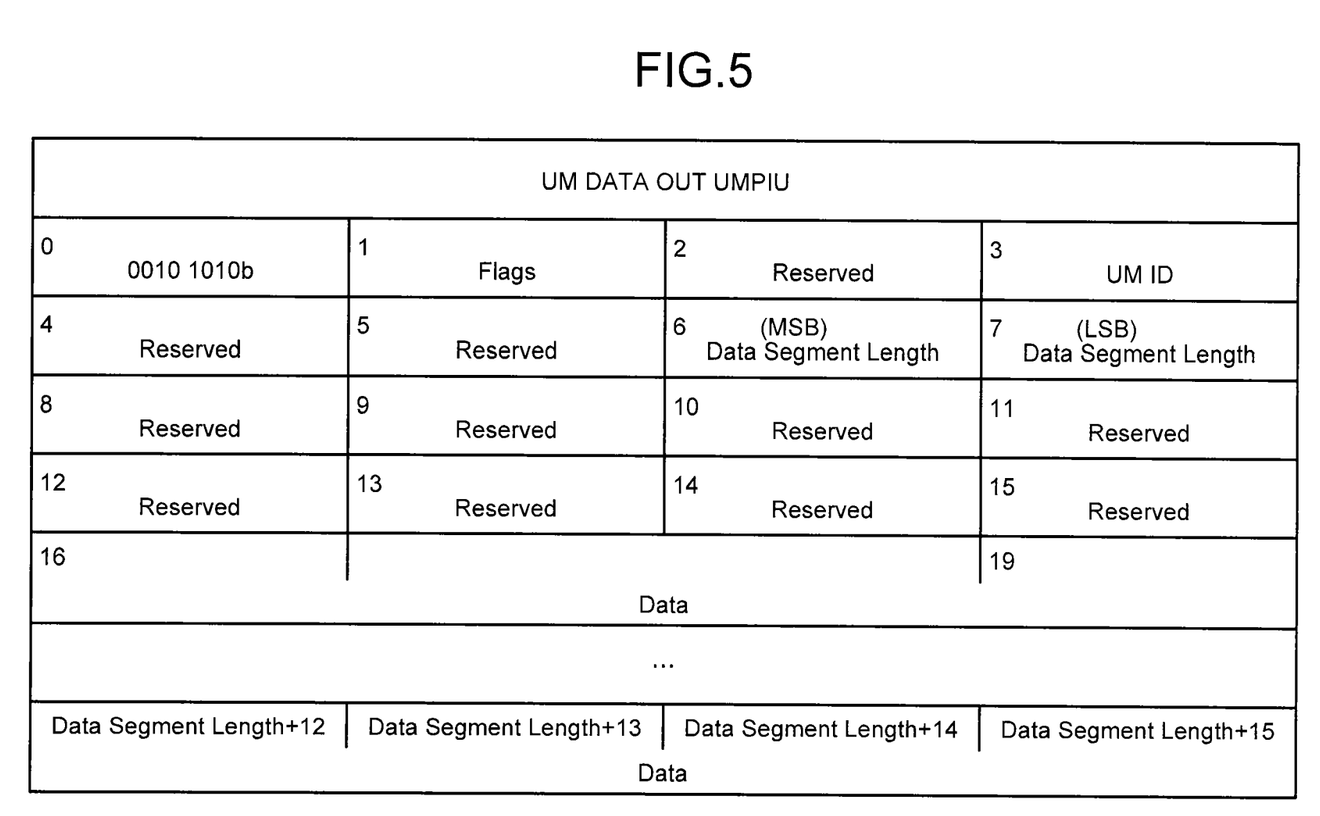
FIG. 5 is a diagram illustrating a format example of a data packet (UM DATA OUT UMPIU) generated in a process based on a memory read request.

FIG. 5 is a diagram illustrating a format example of a data packet (UM DATA OUT UMPIU) generated in a process based on a memory read request. UM DATA OUT UMPIU is UMPIU for transmitting data read from the UM 24 to the memory system 1. UM DATA OUT UMPIU illustrated in FIG. 5 has a structure which is the same as that of UM DATA IN UMPIU illustrated in FIG. 3.

In UM DATA OUT UMPIU, "Transaction code," "Flags," and "UM ID" are stored, in the same manner as Response UMPIU illustrated in FIG. 4. "00101010b" stored in Field 0 is a Transaction code which represents that the packet is UM DATA OUT UMPIU. "Data Segment Length" indicates the size of data stored in the packet. The data stored in Field 16 and subsequent fields is in the size indicated by "Data Segment Length."

The controller main unit 20 may have two formats as packet formats. The controller main unit 20 selects one of the two formats according to the data size.

Figure 6:
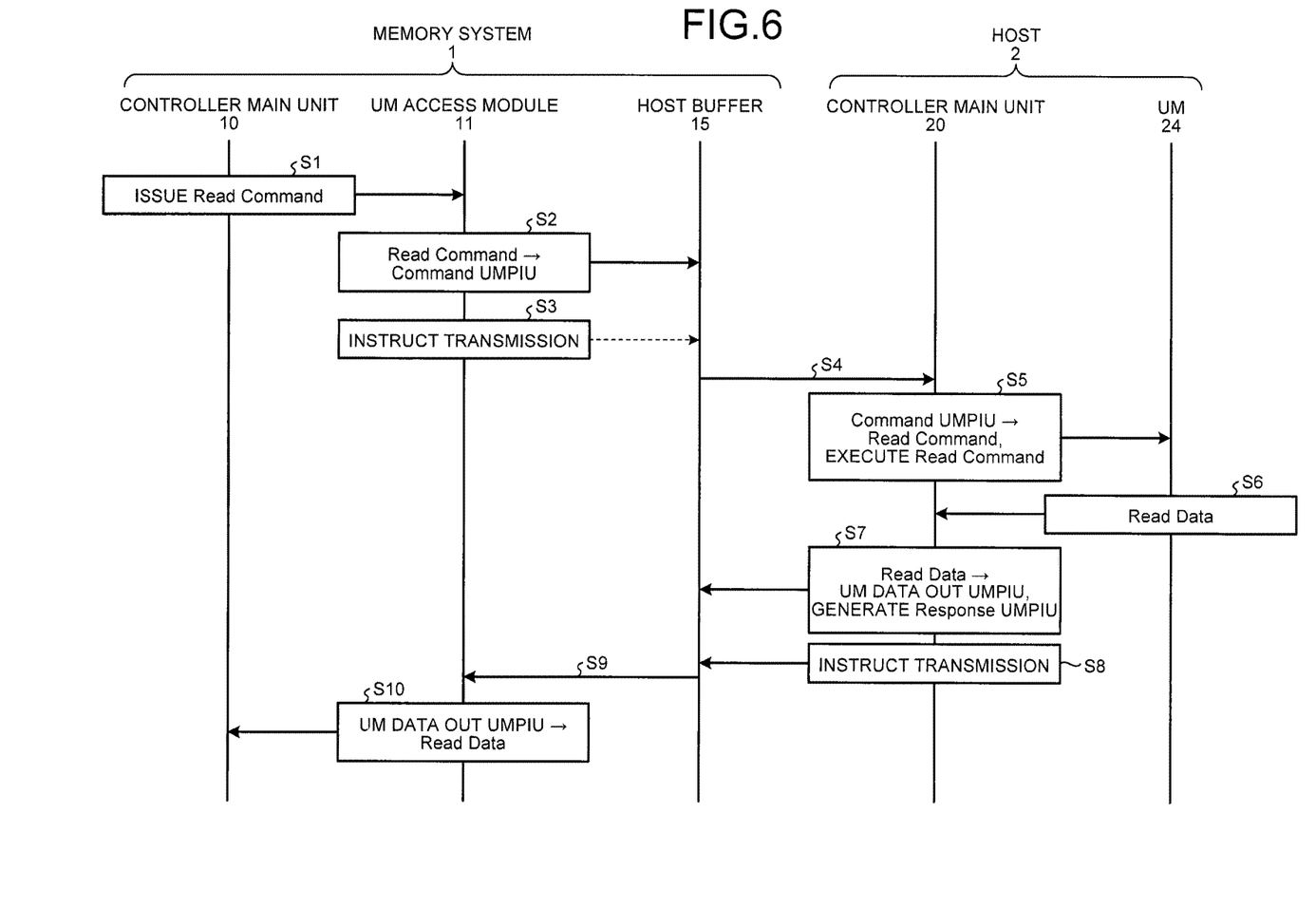
FIG. 6 is a diagram illustrating an operation example of the information processing apparatus when a memory system reads data from a UM (Unified Memory)

FIG. 6 is a diagram illustrating an operation example of the information processing apparatus when the memory system reads data from the UM. The controller main unit 10 issues a memory read request as a first request (step S1). The memory read request includes a command (Read Command) and an address. The bus 18 transmits the memory read request issued by the controller main unit 10 to the UM access module 11.

The UM access module 11 receives the memory read request issued in step S1. The UM access module 11 generates Command UMPIU based on the memory read request (step S2). The UM access module 11 stores respective information in a header part of Command UMPIU according to contents of Read Command and an address included in the received request. The UM access module 11 sets "1" in Flags. R.

The UM access module 11 writes Command UMPIU generated in step S2 to the host buffer 15. The UM access module 11 instructs the UM I/F 14 to transmit Command UMPIU written in the host buffer 15 (step S3).

The UM I/F 14 reads Command UMPIU from the host buffer 15 according to the instruction received in step S3. The UM I/F 14 transmits read Command UMPIU to the host 2 via the communication path 3 (step S4).

The device I/F 21 receives Command UMPIU transmitted in step S4. The controller main unit 20 converts Command UMPIU received by the device I/F 21 into a memory read request as a second request. The controller main unit 20 generates Read Command and an address to be included in the memory read request based on the respective information stored in the header part of Command UMPIU.

The controller main unit 20 executes a process based on the memory read request (step S5). The controller main unit 20 reads data (Read Data) from the UM 24 (step S6). The controller main unit 20 reads data stored in a region indicated by Data Length, starting from a position of an address included in the memory read request.

The host 2 may be made to have any structure to convert Command UMPIU into a memory read request. The host 2 may execute a process based on the memory read request with any structure. The CPU 22 may convert Command UMPIU into a memory read request and executes a process based on the memory read request.

The controller main unit 20 generates UM DATA OUT UMPIU based on Read Data. The controller main unit 20 generates Response UMPIU (step S7). The controller main unit 20 divides Read Data by the size of "Data Segment Length." The controller main unit 20 stores the divided data to the data part of UM DATA OUT UMPIU. The controller main unit 20 stores the respective information to the header parts of UM DATA OUT UMPIU and Response UMPIU according to the content of the memory read request.

When an error occurs in the execution of the process based on the request, the controller main unit 20 sets "1" to "Flags. I" or "Flags. E" of Response UMPIU according to the content of the error. The controller main unit 20 transmits Response UMPIU as a response to the execution of the process based on the memory read request. The device I/F 21 transmits UM DATA OUT UMPIU and Response UMPIU generated in the controller main unit 20 to the memory system 1 via the communication path 3. The device I/F 21 transmits Response UMPIU after transmitting all UM DATA OUT UMPIU which is obtained as divided Read Data.

The UM I/F 14 receives UM DATA OUT UMPIU and Response UMPIU transmitted from the device I/F 21. The UM I/F 14 writes received UM DATA OUT UMPIU and Response UMPIU to the host buffer 15. The controller main unit 20 instructs the host buffer 15 to transmit UM DATA OUT UMPIU and Response UMPIU to the UM access module 11 (step S8).

The host buffer 15 transmits UM DATA OUT UMPIU and Response UMPIU to the UM access module 11 according to the instruction in step S8 (step S9). The UM access module 11 converts UM DATA OUT UMPIU received from the host buffer 15 into original Read Data (step S10). The UM access module 11 transmits Read Data, which is obtained in step S10, and Response UMPIU to the controller main unit 10. With the above process, the information processing apparatus transfers desired data stored in the UM 24 to the device controller 5.

Figure 7:
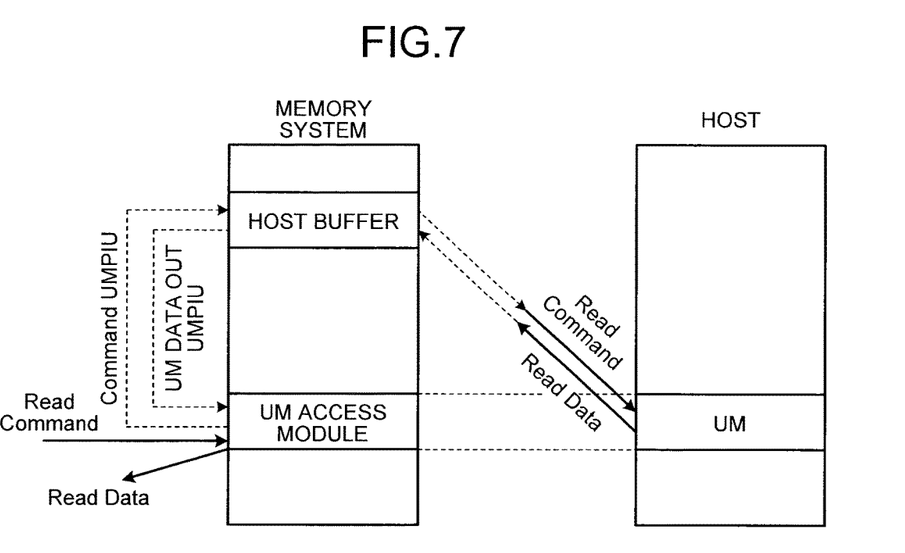
FIG. 7 is a diagram illustrating an address space of the memory system and an address space of a host.

FIG. 7 is a diagram illustrating an address space of the memory system and an address space of the host. The controller main unit 10 allocates an address to a memory region of each module in the memory system 1. The controller main unit 10 manages data transfer between the modules using the addresses. The controller main unit 10 uses a part of the address space of the memory system 1 as a temporary address of the UM access module 11. The controller main unit 10 allocates an address of a first range in the address space of the memory system 1 to the UM access module 11. The controller main unit 10 allocates an address of a second range in the address space of the memory system 1 to the host buffer 15.

The controller main unit 10 includes, in a data read request from a module, an address which represents a location of data to be read. The most significant bit (MSB) of the address represents a module. The least significant bit (LSB) of the address represents a location in a memory region of the module.

The controller main unit 10 includes, in a memory read request for reading data from the UM 24, an address which is allocated to the UM access module 11. The MSB of the address represents the UM access module 11. The LSB of the address is used as "Target UM Area Offset." The LSB of the address represents a location in the UM 24.

When a memory read request for reading data from the UM 24 is issued, the bus 18 transmits the memory read request to the UM access module 11 according to the MSB of the address. The bus 18 inputs the LSB of the address included in the memory read request to the UM access module 11. The UM access module 11 sets the LSB of the input address to "Target UM Area Offset" of Command UMPIU.

The host buffer 15 stores Command UMPIU generated by the UM access module 11. The UM I/F 14 transmits Command UMPIU to the host 2 from the host buffer 15 according to the instruction from the UM access module 11.

The controller main unit 20 converts Command UMPIU transmitted from the memory system 1 into a memory read request. The controller main unit 20 uses information stored in "Target UM Area Offset" as an address to be included in the memory read request. The controller main unit 20 reads data from a position represented by the address.

The controller main unit 20 converts data (Read Data) read from the UM 24 into UM DATA OUT UMPIU. UM DATA OUT UMPIU is sent back to the UM access module 11 via the host buffer 15. The UM access module 11 converts UM DATA OUT UMPIU received from the host buffer 15 into original Read Data. The UM access module 11 transmits Read Data to the controller main unit 10.

With this configuration, the controller main unit 10 reads desired data stored in the UM 24. The controller main unit 10 reads data of the UM 24 by issuing a memory read request including an address allocated to the UM access module 11.

The controller main unit 10 can read data from the UM 24 by an operation same as the case of reading data from a module in the memory system 1. When reading data from the UM 24, the controller main unit 10 operates the same as the case of reading data from the RAM 12 or the NAND memory 4.

Figure 8:
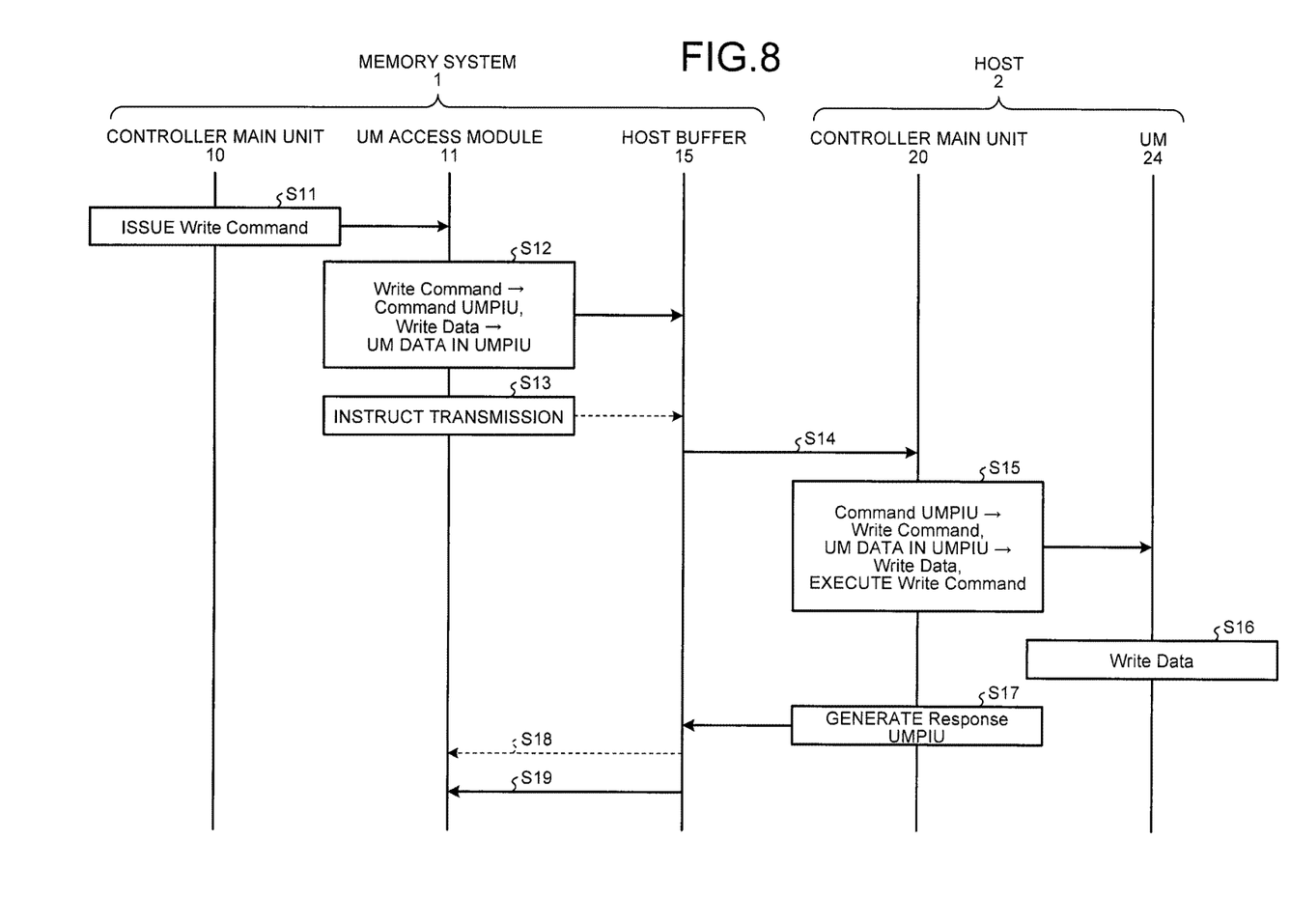
FIG. 8 is a diagram illustrating an operation example of the information processing apparatus when the memory system writes data to the UM.

FIG. 8 is a diagram illustrating an operation example of the information processing apparatus when the memory system writes data to the UM. The controller main unit 10 issues a memory write request as a first request (step S11). The memory write request includes a command (Write Command) and an address. The bus 18 transmits the memory write request from the controller main unit 10 to the UM access module 11.

The UM access module 11 receives the memory write request issued in step S11. The UM access module 11 reads data to be written (Write Data). The UM access module 11 generates Command UMPIU based on the memory write request. The UM access module 11 converts Write Data into UM DATA IN UMPIU (step S12).

The UM access module 11 stores respective information in a header part of Command UMPIU according to the content of Write Command and the address included in the received request. The UM access module 11 sets "1" to Flags. W.

The UM access module 11 writes Command UMPIU and UM DATA IN UMPIU generated in step S12 to the host buffer 15. The UM access module 11 instructs the UM I/F 14 to transmit written Command UMPIU and UM DATA IN UMPIU in the host buffer 15 (step S13).

The UM I/F 14 reads Command UMPIU and UM DATA IN UMPIU from the host buffer 15 according to the instruction received in step S13. The UM I/F 14 transmits read Command UMPIU and UM DATA IN UMPIU to the host 2 via the communication path 3 (step S14).

The device I/F 21 receives Command UMPIU and UM DATA IN UMPIU transmitted in step S14. The controller main unit 20 converts Command UMPIU received in the device I/F 21 into a memory write request as a second request. The controller main unit 20 converts UM DATA IN UMPIU received in the device I/F 21 into original Write Data. The controller main unit 20 generates Write Command and an address to be included in the memory write request based on respective information stored in the header part of Command UMPIU.

The controller main unit 20 executes a process based on the memory write request (step S15). The controller main unit 20 writes Write Data in a location of the address included the memory write request (step S16).

The host 2 may execute a conversion from Command UMPIU to a memory write request and a conversion from UM DATA IN UMPIU to Write Data with any configuration. The host 2 may execute a process based on a memory write request with any configuration. The CPU 22 may execute a conversion from Command UMPIU to memory write request and a conversion from UM DATA IN UMPIU to Write Data. The CPU 22 may execute a process based on the memory write request.

The controller main unit 20 generates Response UMPIU (step S17). The controller main unit 20 stores respective information in a header part of Response UMPIU according to the content of the memory write request. When an error occurs in the execution of the process based on the request, the controller main unit 20 sets "1" to "Flags. I" or "Flags. E" of Response UMPIU.

The controller main unit 20 transmits Response UMPIU as a response to the execution of the process based on the memory write request. The device I/F 21 transmits Response UMPIU generated in the controller main unit 20 to the memory system 1 via the communication path 3.

The host buffer 15 receives Response UMPIU from the controller main unit 20. The host buffer 15 transmits an interrupt signal to the UM access module 11 (step S18). The interrupt signal may be transmitted from the host I/F 13 to the UM access module 11. Upon receiving the interrupt signal, the UM access module 11 reads Response UMPIU from the host buffer 15 (step S19). The UM access module 11 transmits a bus response to the controller main unit 10 via the bus 18 according to need.

With the above configuration, the controller main unit 10 writes data stored in the device controller 5 to the UM 24. The host controller 6 may send back an acknowledgment (ACK) to the memory system 1 as substitute for Response UMPIU. When a memory write request is acquired, the controller main unit 20 transmits ACK to the memory system 1.

Figure 9:
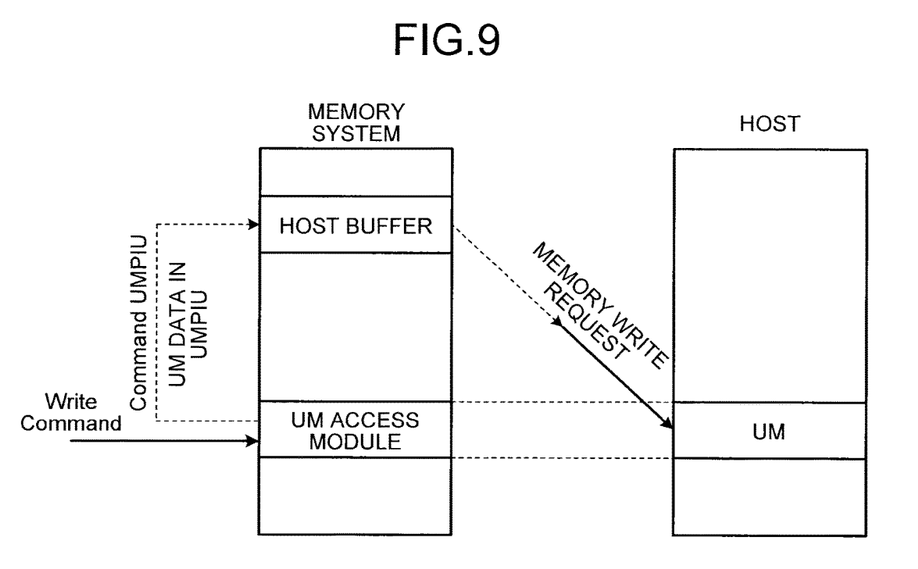
FIG. 9 is a diagram illustrating the address space of the memory system and the address space of the host.

FIG. 9 is a diagram illustrating the address space of the memory system and the address space of the host. The controller main unit 10 includes an address which represents a location where data is written in a data write request to a module.

The controller main unit 10 includes an address allocated to the UM access module 11 in a memory write request for writing data to the UM 24. The MSB of the address represents the UM access module 11. The LSB of the address is used as "Target UM Area Offset." The LSB of the address represents a location in the UM 24.

When a memory write request for writing data to the UM 24 is issued, the bus 18 transmits a memory write request to the UM access module 11 according to the MSB of the address. The bus 18 inputs the LSB of the address included in the memory write request to the UM access module 11. The UM access module 11 sets the LSB of the input address to "Target UM Area Offset" of Command UMPIU.

The host buffer 15 stores Command UMPIU and UM DATA IN UMPIU which are generated in the UM access module 11. The UM I/F 14 transmits Command UMPIU and UM DATA IN UMPIU from the host buffer 15 to the host 2 according to the instruction from the UM access module 11.

The controller main unit 20 converts Command UMPIU transmitted from the memory system 1 into a memory write request. The controller main unit 20 uses the information stored in "Target UM Area Offset" as an address to be included in the memory write request. The controller main unit 20 writes data in the location represented by the address.

With this configuration, the controller main unit 10 writes data in a desired location in the UM 24. The controller main unit 10 writes data to the UM 24 by issuing a memory write request including an address allocated to the UM access module 11.

The controller main unit 10 can write data to the UM 24 by an operation the same as the case for writing data to a module in the memory system 1. When writing data to the UM 24, the controller main unit 10 operates the same as the case for writing data to the RAM 12 or the NAND memory 4.

Figure 10:
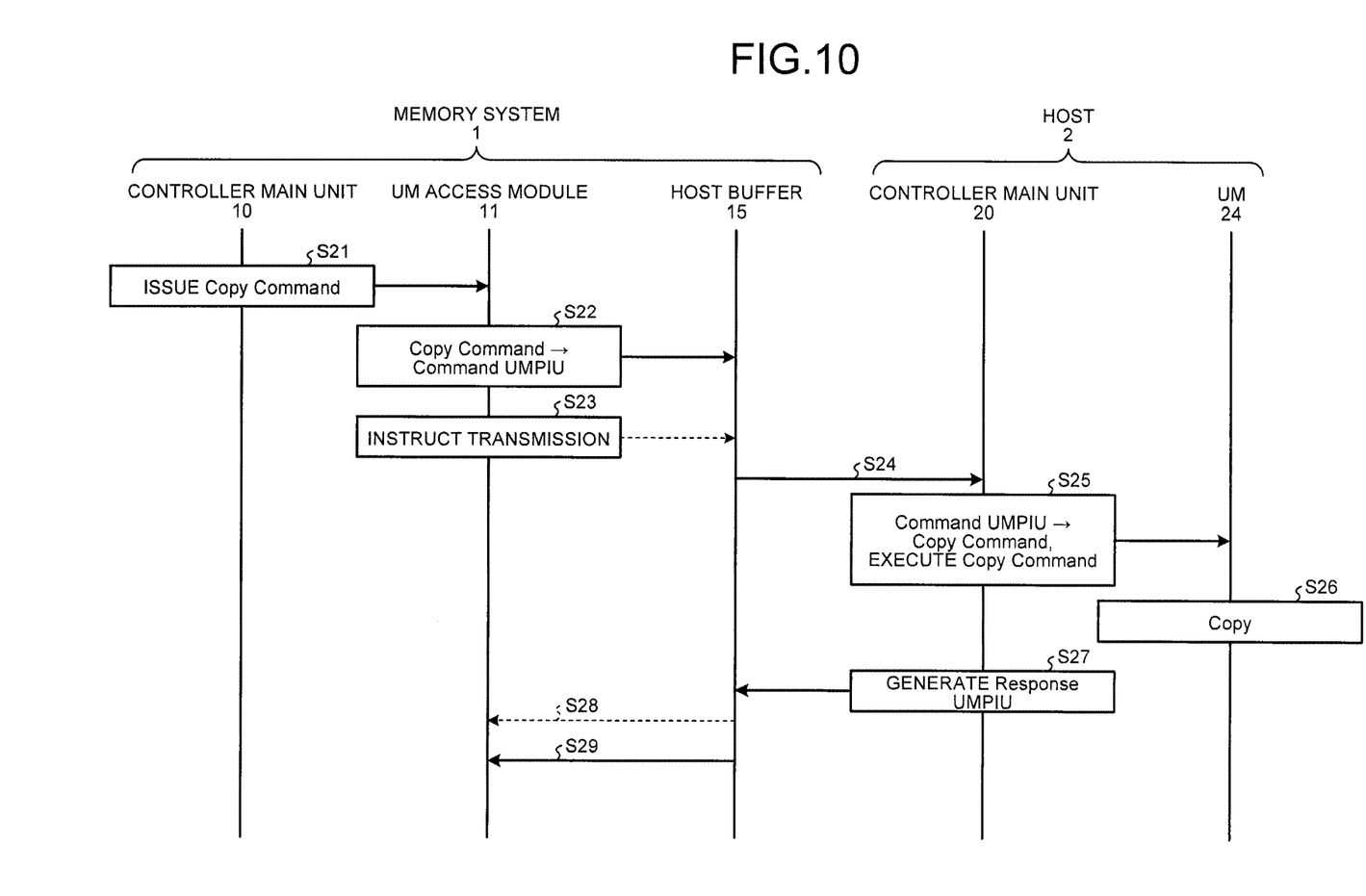
FIG. 10 is a diagram illustrating an operation example of the information processing apparatus when copying data stored in the UM within the UM.

FIG. 10 is a diagram illustrating an operation example of the information processing apparatus when copying data stored in the UM within the UM. The controller main unit 10 issues a memory copy request as a first request (step S21).

The memory read request includes a command (Copy Command), Source and Destination. Source represents a first location. The first location is a location where data to be copied is stored. Destination represents a second location. The second location is a location where copied data is stored. The bus 18 transmits a memory copy request from the controller main unit 10 to the UM access module 11.

The UM access module 11 receives the memory copy request issued in step S21. The UM access module 11 generates Command UMPIU based on the memory copy request (step S22). Command UMPIU includes respective information of Copy Command, Source and Destination of the memory copy request. The UM access module 11 writes Command UMPIU generated in step S22 to the host buffer 15.

The UM access module 11 instructs the UM I/F 14 to transmit Command UMPIU which is written in the host buffer 15 (step S23). The UM I/F 14 reads Command UMPIU from the host buffer 15 according to the instruction received in step S23. The UM I/F 14 transmits read Command UMPIU to the host 2 via the communication path 3 (step S24).

The device I/F 21 receives Command UMPIU transmitted in step S24. The controller main unit 20 converts Command UMPIU received by the device I/F 21 into a memory copy request as a second request. The controller main unit 20 generates Copy Command, Source and Destination to be included in the memory copy request based on respective information stored in a header part of Command UMPIU.

The controller main unit 20 executes a process based on the memory copy request (step S25). The controller main unit 20 copies data stored in the location where Source represents. The controller main unit 20 stores the copied data (Copy Data) in a location where Destination represents (step S26).

The host 2 may execute the conversion from Command UMPIU to memory copy request with any configuration. The host 2 may execute a process based on the memory copy request with any configuration. The CPU 22 may execute a process based on the memory copy request by converting Command UMPU to memory copy request.

The controller main unit 20 generates Response UMPIU (step S27). The controller main unit 20 stores respective information in a header part of Response UMPIU based on the content of the memory copy request. The controller main unit 20 transmits Response UMPIU as a response to the execution of the process based on the memory copy request. The device I/F 21 transmits Response UMPIU which is generated in the controller main unit 20 to the memory system 1 via the communication path 3.

The host buffer 15 receives Response UMPIU sent from the controller main unit 20. The host buffer 15 transmits an interrupt signal to the UM access module 11 (step S28). The interrupt signal may be transmitted from the host I/F 13 to the UM access module 11. Upon receiving the interrupt signal, the UM access module 11 reads Response UMPIU from the host buffer 15 (step S29). The UM access module 11 transmits a bus response to the controller main unit 10 via the bus 18 according to need.

With the above configuration, the host controller 6 executes a data copy within the UM 24 in response to a request from the device controller 5. The host controller 6 may send back an acknowledgment (ACK) to the memory system 1 as substitute for Response UMPIU. When a memory copy request is received, the controller main unit 20 transmits ACK to the memory system 1.

The controller main unit 10 can make a copy of data within the UM 24 by an operation the same as a case of data transfer using Direct Memory Access Controller (DMAC). The device controller 5 can execute a memory copy of the UM 24 as if directly operating DMAC in the host 2.

According to the embodiment, the controller main unit 10 issues a request for data transfer toward the UM 24. The UM access module 11 executes the data transfer toward the UM 24. The UM access module 11 generates a packet. The UM access module 11 instructs the UM I/F 14 to transmit a packet stored in the host buffer 15.

As substitute for the controller main unit 10, the UM access module 11 generates a packet in data transfer toward the UM 24. As substitute for the controller main unit 10, the UM access module 11 controls packet transmission.

The device controller 5 may include a plurality of modules which can serve as the controller main unit 10. The plurality of modules are a CPU and other control devices. The plurality of modules does not require a process of generating a packet and a process of controlling packet transmission. Thus, with the UM access module 11, the memory system 1 can control on a scale of hardware. The memory system 1 can reduce processing loads of the CPU and other control devices as a requestor of data transfer toward the UM 24.

The controller main unit 10 can execute data transfer toward the UM 24 by an operation the same as the case of data transfer toward a module in the memory system 1. With the UM access module 11, the memory system 1 can reduce processing loads required for data transfer toward the UM 24.

The host 2 may be provided with a device compliant with a standard other than UFS standard. For instance, when the CPU as the controller main unit 10 generates a packet, the CPU uses a firmware of each standard for a process of generating a packet.

In the memory system 1 according to the embodiment, a function for generating a packet of each standard is included in the UM access module 11. The CPU and other control devices serving as a requestor of data transfer toward the UM 24 do not require a firmware for generating a packet of each standard. The memory system 1 can control on a scale of software.

According to the above description, the memory system 1 and the information processing apparatus can realize data transfer toward the UM 24 with a simple configuration. The memory system 1 and the information processing apparatus can reduce processing load of data transfer toward the UM 24.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
   a host having a main memory; and
   a memory system having a non-volatile memory and being connected to the host via a communication path,
   wherein the memory system has a first controller for controlling data transfer between the non-volatile memory and the host,
   the host has a second controller for controlling data transfer between the main memory and the memory system,
   the first controller has
   a plurality of modules including a memory access unit and a host buffer, a first range of an address space of the memory system being allocated to the memory access unit, a second range of the address space of the memory system being allocated to the host buffer, addresses of the address space being addresses that are used dedicatedly in controlling data transfer between the modules in the first controller,
   a processor circuit configured to control data transfer between the modules using the addresses of the address space and configured to issue a first request with an address in the first range and transmit the first request to the memory access unit, and
   an interface unit connected to the second controller via the communication path, the memory access unit converts the first request into transmission information,
   the host buffer receives the transmission information from the memory access unit and stores the transmission information,
   the interface unit transmits the transmission information stored in the host buffer to the second controller,
   the second controller converts the transmission information from the interface unit into a second request and executes a process toward the main memory based on the second request,
   wherein the processor circuit issues the first request that includes an address including a bit to represent a module targeted in data transfer among the modules, and
   a most significant bit of the address included in the first request represents the memory access unit.

2. The information processing apparatus according to claim 1,
   wherein the first request and the second request are memory read requests for reading out data stored in the main memory to the first controller.

3. The information processing apparatus according to claim 2,
   wherein the second controller converts the data read from the main memory by executing the process based on the second request into response information and sends back the response information to the memory system.

4. The information processing apparatus according to claim 3,
   wherein the interface unit receives the response information sent back from the second controller, and
   the memory access unit converts the response information received by the interface unit into data read from the main memory.

5. The information processing apparatus according to claim 1,
   wherein the first request and the second request are memory write requests for writing data stored in the first controller to the main memory.

6. The information processing apparatus according to claim 5,
   wherein the memory access unit converts the first request including data to be written into the transmission information, and
   the second controller converts the transmission information into the second request and writes data to the main memory by executing the process based on the second request.

7. The information processing apparatus according to claim 1, wherein the first request and the second request are memory copy requests for storing a copy of data stored in a first location of the main memory to a second location of the main memory .

8. The information processing apparatus according to claim 1,
wherein the memory access unit converts the first request into a packet as the transmission information.

9. The info nation processing apparatus according to claim 3,
wherein the second controller converts the data read from the main memory into a packet as the response information.

10. The information processing apparatus according to claim 9,
wherein the interface unit receives the packet sent back from the second controller, and
the memory access unit converts the packet received by the interface unit into data read from the main memory.

11. A memory system, comprising:
a non-volatile memory; and
a controller configured to be able to connect to a host via a communication path and configured to control data transfer between the non-volatile memory and the host, the host including a main memory,
wherein the controller has
a plurality of modules including a memory access unit and a host buffer, a first range of an address space of the memory system being allocated to the memory access unit, a second range of the address space of the memory system being allocated to the host buffer, addresses of the address space being addresses that are used dedicated in controlling data transfer between the modules in the controller,
a processor circuit configured to control data transfer between the modules using the addresses of the address space and configured to issue a request with an address in the first range and transmit the request to the memory access unit, and
an interface unit configured to connect to the host via the communication path,
the memory access unit converts the request into transmission information,
the host buffer receives the transmission information from the memory access unit and stores the transmission information,
the interface unit transmits the transmission information stored in the host buffer to the host,
wherein the processor circuit issues the request that includes an address including a bit to represent a module targeted in data transfer among the modules, and
a most significant bit of the address in the first range represents the memory access unit.

12. The memory system according to claim 11,
wherein the request is a memory read request for reading out data stored in the main memory to the controller.

13. The memory system according to claim 12,
wherein the interface unit receives response information from the host in which a process based on the memory read request is executed, and
the memory access unit converts the response information received by the interface unit into data read from the main memory.

14. The memory system according to claim 11, wherein the request is a memory write request for writing data stored in the controller to the main memory.

15. The memory system according to claim 14,
wherein the memory access unit converts the request including data to be written into the transmission information.

16. The memory system according to claim 11,
wherein the request is a memory copy request for storing a copy of data stored in a first location of the main memory to a second location of the main memory.

17. The memory system according to claim 11,
wherein the memory access unit converts the request into a packet as the transmission information.

18. The memory system according to claim 13,
wherein data read from the main memory is converted into a packet in the host,
the interface unit receives the packet as the response information, and
the memory access unit converts the packet received by the interface unit into data read from the main memory.

* * * * *